United States Patent [19]

Säfström

[11] Patent Number: 5,034,175

[45] Date of Patent: Jul. 23, 1991

[54] METHOD AND APPARATUS FOR MANUFACTURING FIBER BOARD SHEETS

[75] Inventor: Christer K. S. Säfström, Opicina Trieste, Italy

[73] Assignee: Sunds Defibrator Industries Aktiebolag, Sweden

[21] Appl. No.: 488,038

[22] PCT Filed: Oct. 18, 1988

[86] PCT No.: PCT/SE88/00546

§ 371 Date: May 15, 1990

§ 102(e) Date: May 15, 1990

[87] PCT Pub. No.: WO89/05716

PCT Pub. Date: Jun. 29, 1989

[30] Foreign Application Priority Data

Dec. 16, 1987 [SE] Sweden ........................... 8705012-6

[51] Int. Cl.[5] ...................... B29C 43/26; B29C 43/34

[52] U.S. Cl. .................................. 264/120; 264/115; 264/121; 425/82.1; 425/83.1

[58] Field of Search .............. 264/109, 115, 120, 121, 264/517, 518; 425/80.1, 81.1, 82.1, 83.1; 241/28

[56] References Cited

U.S. PATENT DOCUMENTS

| | | | |
|---|---|---|---|
| 3,903,229 | 9/1975 | Mark | 264/115 |
| 4,407,771 | 10/1983 | Betzner et al. | 264/115 |

FOREIGN PATENT DOCUMENTS

| | | |
|---|---|---|
| WO83/04387 | 12/1982 | PCT Int'l Appl. . |
| WO85/05065 | 11/1985 | PCT Int'l Appl. . |
| WO88/05372 | 7/1988 | PCT Int'l Appl. . |

*Primary Examiner*—Mary Lynn Theisen

*Attorney, Agent, or Firm*—Lerner, David, Littenberg, Krumholz & Mentlik

[57] ABSTRACT

Methods for manufacturing fiber board sheets from defibered lignocellulose-containing material are disclosed, including drying the defibered lignocellulose-containing material with heated gas in a tube dryer, transferring the dried lignocellulose-containing material directly to a forming station, and forming the dried lignocellulose-containing material into a fiber web at the forming station whereby the temperature of the dried lignocellulose-containing material is substantially maintained from the drying step to the forming station. Apparatus for manufacturing fiber board sheets utilizing this method are also disclosed.

14 Claims, 1 Drawing Sheet

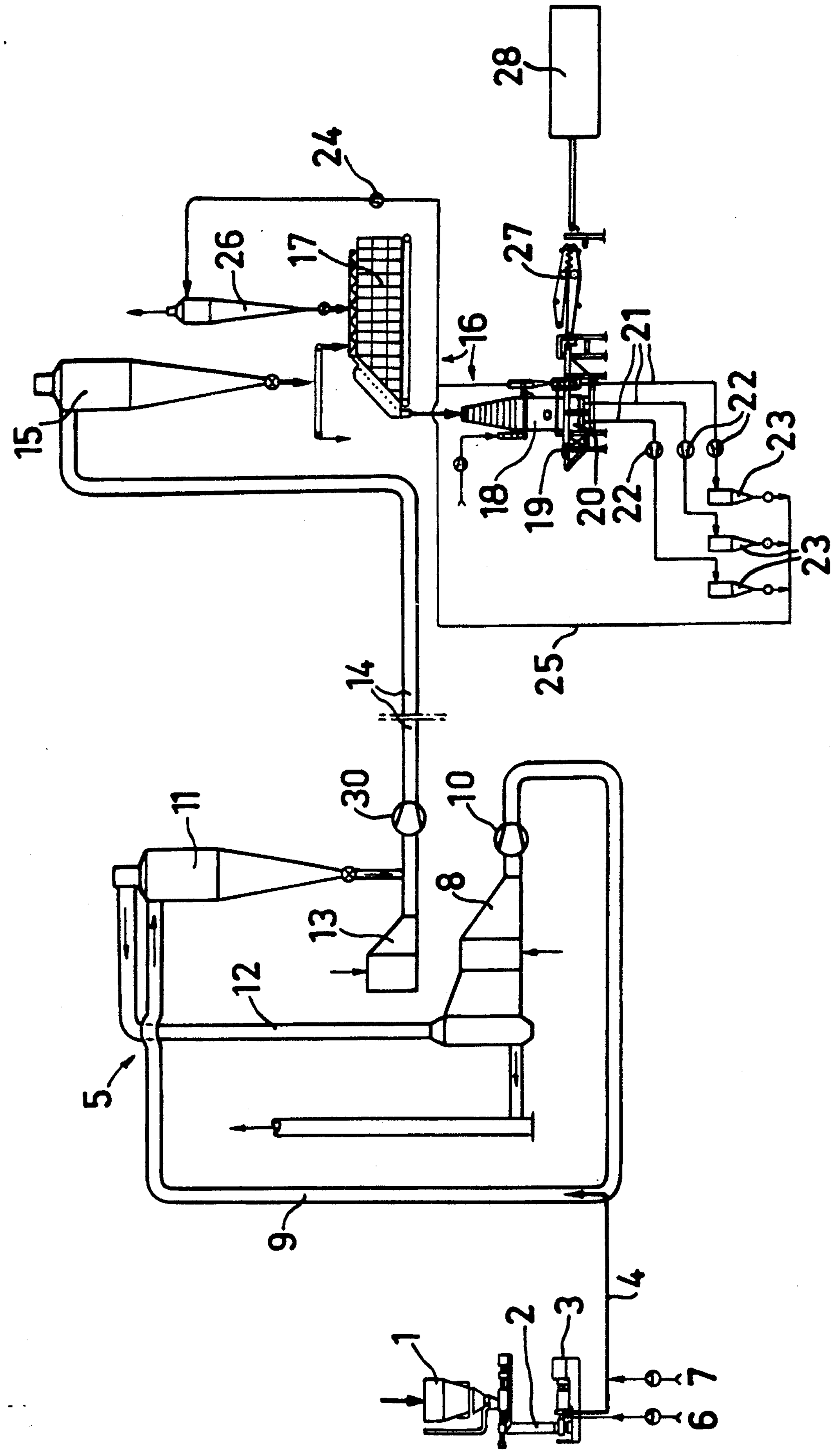
1
2
3
4
5
6
7
8
9
10
11
12
13
14
15
16
17
18
19
20
21
22
23
24
25
26
27
28
30

METHOD AND APPARATUS FOR MANUFACTURING FIBER BOARD SHEETS

FIELD OF THE INVENTION

The present invention relates to methods for manufacturing fiber board sheets. More particularly, the present invention relates to methods for manufacturing fiber board sheets from lignocellulose-containing material such as wood, straw, bagasse, etc., using the dry method. Still more particularly, the present invention relates to an apparatus for manufacturing fiber board sheets from lignocellulose-containing material.

BACKGROUND OF THE INVENTION

Fiber board sheets designated as the MDF (medium density fiber board) type are conventionally producing fiber in a defibrator, drying the fiber together with resin, wax, etc. in a tube drier, and transporting the dried fiber by means of a pneumatic or mechanical conveying system to a fiber bin, from which it is discharged in a controlled manner to a conveying system for feeding same to a mat-laying station, in which a fiber mat is formed in a controlled manner.

The thus-formed fiber mats are subsequently hot-pressed in the production line to form a complete MDF-sheet. Multi-layer sheets are also manufactured in a corresponding manner. In these processes a considerable amount of energy is employed from the drying step all the way to the forming step, for both the drying itself and in order to effect the conveying of the dried material. The moisture content of the fibers prior to the drying is about 100%, and after the drying is about 10%.

Because of the special requirements placed on the drying procedures required for the drying of fibers, it is not possible to use the more energy-efficient driers which are used, for example, in the particle board industry, but one is essentially limited to the use of a tube drier. This type of drier, however, requires a great amount of energy per ton of fiber. This energy is normally produced in a steam boiler, hot oil boiler, or the like, with the energy then being transferred to the drying gas by means of a heat exchanger.

Upon their discharge from the drier, the dried fibers generally have a temperature of between about 60 and 70 ° C. After being handled in the manner described above, the temperature of the fibers then drops to around room temperature. During the subsequent hot pressing the fiber mat must then be reheated to a temperature above about 100° C. in order to bring about the intended curing of the resin which is required in order to obtain a sheet having sufficient strength. For these reasons, not only is additional energy lost, but at the same time the heating time in the hot press is rather long, and therefore the rate of production is restricted.

An object of the present invention is to reduce the energy demand during the manufacture of fiber board sheets while utilizing the dry method.

SUMMARY OF THE INVENTION

These and other objects are achieved in accordance with the present invention by maintaining the temperature of the fibers at a high level after the drying step and substantially continuously up to the forming step. Furthermore, one significant aspect of the present invention in which a two-step drying press is employed permits separation of the drying gas from the fibers during the second drying step using a device of a reduced size. Furthermore, the drying gas can be maintained at a dryer condition, and a higher press capacity is achieved thereby.

In accordance with the present invention, a method has thus been discovered for manufacturing fiber board sheets from defibered lignocellulose-containing material comprising drying the defibered lignocellulose-containing material with heated gas in a tube dryer, transferring the dried lignocellulose-containing material directly to a forming station, and forming the dried lignocellulose-containing material into a fiber web at the forming station such that the temperature of the dried lignocellulose-containing material is substantially maintained from the drying step to the forming station. In a preferred embodiment, the defibered lignocellulose-containing material is mixed with a binding agent. Preferably, the method included pre-pressing the fiber web, and more particularly, also includes pressing the pre-pressed fiber web in a hot press.

In accordance with another embodiment of the method of the present invention, the heated gas is maintained in contact with the dried lignocellulose-containing material substantially throughout the transferring step. In a preferred embodiment, drying of the defibered lignocellulose-containing material is carried out in first and second drying steps. Preferably, this method includes maintaining the heated gas in contact with the dried lignocellulose-containing material throughout the transferring step.

In accordance with the apparatus of the present invention for manufacturing fiber board sheets from defibered lignocellulose-containing material, there is provided drying means comprising a tube dryer for drying the defibered lignocellulose-containing material with a heated gas, forming means for forming the dried lignocellulose-containing material into a fiber web, and transfer means for transferring the dried lignocellulose-containing material from the drying means directly to the forming means.

In a preferred embodiment, the transfer means comprises a cyclone for separating the heated gas from the dried lignocellulose-containing material, and the cyclone is juxtaposed with the forming means so a to directly transfer the lignocellulose-containing material from the cyclone to the forming means.

In a preferred embodiment, the apparatus includes means for supplying binding agent to the defibered lignocellulose-containing material. Preferably, the apparatus also includes a pre-pressing means for pre-pressing the fiber web, and most preferably, also includes a hot press for pressing the pre-pressed fiber web.

In accordance with another embodiment of the apparatus of the present invention, the forming means includes a fiber bin, and preferably also includes a mat-laying station, wherein the fiber bin is located directly above the mat-laying station. In one embodiment the fiber bin and the mat-laying station comprise a single unit, whereby the laying of the fibers in the mat-laying station takes place directly from the fiber bin.

In accordance with another embodiment of the apparatus of the present invention, the drying means comprises first drying means comprising a first tube dryer for partially drying the defibered lignocellulose-containing material, and second drying means comprising a second dryer for drying the partially dried lignocellulose-containing material. In a preferred embodiment, the drying means further comprises a first cyclone for separating the heated gas from the partially dried lignocellulose-containing material in between the first and second drying means, and most preferably, the transfer means comprises a second cyclone for separating the heated gas from the dried lignocellulose-containing material.

BRIEF DESCRIPTION OF THE FIGURE

The present invention can be more fully understood with reference to the following detailed description, which, in turn, refers to the accompanying Figure, which shows a flow chart of the method of the present invention.

DETAILED DESCRIPTION

Referring to the Figure, a fiber bin 1 is connected to a preheater 2, from which fibers are supplied to a defibrator 3. Defibered lignocellulose-containing material is directed through a blow line 4, which possibly includes a steam separator, to a tube drier 5. Conduits 6 and 7 for the supply of wax and binding agent, respectively, are normally connected to the defibrator 3 and the blow line 4, as shown, but other arrangements are also possible.

In the embodiment shown in the Figure, the tube drier 5 comprises two stages. The first stage comprises a first device 8 for gas supply and a first drying tube 9 with a first fan 10. The blow line 4 is connected to the drying tube 9, which opens into a first cyclone 11 for gas separation. The separated drying gas is recycled through a return line 12 to the first gas supply device 8 where the heat content can be recovered by heat exchange. The second stage comprises a second device 13 for gas supply and a second drying tube 14 with a second fan 30. The fiber material from the first cyclone 11 is fed into the second drying tube 14, which opens into a second cyclone 15 for gas separation. The second cyclone 15 is located in a position so as to be in direct connection to a forming station 16. In order to achieve optimum drying economy, the temperature in the first drying stage should be higher than that in the second drying stage.

The forming station 16 is of a conventional type, and comprises a fiber bin 17, from which the fibers are fed to a mat-laying station 18, in which the fibers are distributed and laid so as to form a mat on a running wire 19. In most cases, suction boxes 20 are provided beneath the wire 19. These suction boxes 20 are connected through conduits 21 to fans 22, which produce a suitable vacuum in the suction boxes 20. At the same time, the air used for the distribution and laying of the fibers is conducted away thereby. Since a certain amount of fibers will necessarily follow along with this air flow, the conduits 21 open into fiber separators 23, from which separated fibers are transported by a fan 24 through a return line 25 back to the fiber bin 17. Prior to the feeding of these fibers into the fiber bin, the transporting air is separated in a cyclone 26. The separated air from the fiber separators 23 can be at least partially returned to the fiber bin 17 for controlling the air temperature (not shown in the Figure).

The fiber mat thus formed is then subjected, in a conventional manner, to pressing in a pre-press 27, and to final pressing at a temperature above about 100° C. in a hot press 28.

Although the two-stage drying method described above is preferred, it is possible to dry in a one-step tube drier. In that case, subsequent cyclones for gas separation are placed in direct connection to the forming station 16. Compared with one-step driers, however, the use of two-stage driers permits one to realize a reduction of the energy demand by approximately 20%.

In a two-stage drying method, the second cyclone 15 can be designed substantially smaller than the first cyclone 11. This facilitates the required positioning with respect to the forming station 16 directly above the fiber bin 17. The fiber bin itself can be filled directly with hot fibers and, therefore, the need for a pneumatic or mechanical conveying system from the cyclone to the fiber bin, with its concomitant significant energy requirements, can be eliminated. Furthermore, such a conveying system normally results in a cooling of the fibers. Two-stage drying results in the added advantage that the heat-curing binding agent, which is normally supplied in the form of a liquid, more than half of which consists of water, can be supplied between the two drying stages. The moisture ratio is therefore between about 15 and 40%. Compared with systems in which binding is carried out prior to or after the drying stage, several advantages are gained thereby.

Firstly, the resin consumption can be reduced in comparison to the case where binding is carried out prior to the drying, since the resin does not need to be exposed to the temperatures of the first stage, which from the point of view of energy and technical requirements is an elevated temperature. At these high temperatures, however, the resin is partially destroyed, or cures too early.

Furthermore, as compared to the case where binding is carried out after the drying, no resin spots develop, which is the case where the non-uniform resin distribution is produced with binding after the drying stage.

The drying costs also decrease as compared with binding after drying, where drying must be carried out to a lower moisture ratio in order to compensate for the water content of the resin. Moreover, drying to too low a moisture ratio also increases the risk of fire.

Preferably, both binding agent and hardener are added between the drying stages, but it is possible that the hardener can be added after the second drying stage. Because of the low moisture ratio in the second drying stage, the risk of condensation in the fiber bin 17 or in the mat-laying station 18 is avoided.

By positioning the fiber bin 17 directly above the mat-laying station 18, or by utilizing the fiber bin as the mat-laying station, the conventional conveying system at this stage can also be excluded, which again results in a reduced energy consumption, and in the possibility of maintaining the fibers warm. Due to the fact that the temperature of the fibers according to this invention is substantially maintained between the drying and forming steps, the capacity of the hot-press is increased and the energy consumption is decreased.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A method for manufacturing fiber board sheets from defibered lignocellulose-containing material comprising drying said defibered lignocellulose-containing material with heated gas in a tube dryer, transferring said dried lignocellulose-containing material directly to a forming station while maintaining said heated gas in contact with said dried lignocellulose-containing material substantially throughout said transferring step, and forming said dried lignocellulose-containing material into a fiber web at said forming station whereby the temperature of said dried lignocellulose-containing material is substantially maintained from said drying step to said forming station.

2. The method of claim 1 including mixing said defibered lignocellulose-containing material with a binding agent.

3. The method of claim 1 including pre-pressing said fiber web.

4. The method of claim 3 including pressing said prepressed fiber web in a hot press.

5. The method of claim 1 wherein said drying of said defibered lignocellulose-containing material comprises first and second drying steps.

6. Apparatus for manufacturing fiber board sheets from defibered lignocellulose-containing material comprising drying means comprising first drying means comprising a first tube dryer for partially drying said defibered lignocellulose-containing material with a heated gas, second drying means comprising a second tube dryer for drying said partially dried lignocellulose-containing material with a heated gas, and a first cyclone for separating said heated gas from said partially dried lignocellulose-containing material between said first and second drying means, forming means for forming said dried lignocellulose-containing material into a fiber web, and transfer means for transferring said dried lignocellulose-containing material from said drying means directly to said forming means.

7. The apparatus of claim 6 wherein said transfer means comprises a second cyclone for separating said heated gas from said dried lignocellulose-containing material, said second cyclone being juxtaposed with said forming means.

8. The apparatus of claim 6 including means for supplying binding agent to said deifibered lignocellulose-containing material.

9. The apparatus of claim 6 including pre-pressing means for pre-pressing said fiber web.

10. The apparatus of claim 9 including a hot press for pressing said pre-pressed fiber web.

11. The apparatus of claim 6 wherein said forming means includes a fiber bin.

12. The apparatus of claim 11 wherein said forming means includes a mat-laying station, and wherein said fiber bin is located directly above said mat-laying station.

13. The apparatus of claim 11 wherein said forming means includes a mat-laying station, and wherein said fiber bin and said mat-laying station comprise a single unit, whereby the laying of said fibers in said mat-laying station takes place directly from said fiber bin.

14. The apparatus of claim 6 wherein said transfer means comprises a second cyclone for separating said heated gas from said dried lignocellulose-containing material.

* * * * *

UNITED STATES PATENT AND TRADEMARK OFFICE

CERTIFICATE OF CORRECTION

PATENT NO. : 5,034,175

DATED : July 23, 1991

INVENTOR(S) : Christer K. S. Säfström

It is certified that error appears in the above-identified patent and that said Letters Patent is hereby corrected as shown below:

Column 1, line 17, after "conventionally" insert --manufactured according to the so-called "dry method" by--.
Column 2, line 46, delete "a" and insert therefor --as--.

Signed and Sealed this

Twenty-sixth Day of January, 1993

*Attest:*

STEPHEN G. KUNIN

*Attesting Officer* — *Acting Commissioner of Patents and Trademarks*